United States Patent
Yamamoto et al.

(10) Patent No.: US 6,798,581 B2
(45) Date of Patent: Sep. 28, 2004

(54) OPTICAL PICKUP METHOD AND APPARATUS FOR PERFORMING READ AND WRITE OPERATIONS ON RECORDING MEDIA

(75) Inventors: Kenji Yamamoto, Kanagawa (JP); Kiyoshi Osato, Chiba (JP); Yoshiaki Kato, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/985,393

(22) Filed: Nov. 2, 2001

(65) Prior Publication Data

US 2002/0093744 A1 Jul. 18, 2002

(30) Foreign Application Priority Data

Nov. 6, 2000 (JP) .................................. P2000-338137

(51) Int. Cl.$^7$ .................. G02B 27/14; G02B 27/30; G11B 7/00; G11B 7/135
(52) U.S. Cl. ................. 359/637; 359/641; 369/112.24; 369/44.32
(58) Field of Search ................. 359/618–619, 359/636–638, 641; 369/112.05, 112.06, 112.23, 112.24, 44.23, 44.24, 44.32, 44.58, 112.01, 112.2

(56) References Cited

U.S. PATENT DOCUMENTS

| | | | | | |
|---|---|---|---|---|---|
| 4,823,334 | A | * | 4/1989 | Tanaka et al. | 369/112.24 |
| 5,657,168 | A | * | 8/1997 | Maruyama et al. | 359/618 |
| 6,081,488 | A | * | 6/2000 | Yamanaka | 369/44.23 |
| 6,353,582 | B1 | * | 3/2002 | Kikuchi | 369/44.23 |
| 6,411,587 | B1 | * | 6/2002 | Arai et al. | 369/112.01 |
| 2002/0097504 | A1 | * | 7/2002 | Kitamura et al. | 359/637 |

* cited by examiner

Primary Examiner—Georgia Epps
Assistant Examiner—Alicia M Harrington
(74) Attorney, Agent, or Firm—Rader, Fishman & Grauer PLLC; Ronald P. Kananen

(57) ABSTRACT

An optical pickup apparatus, in which the quantity of light incident to an aperture diaphragm of an objective lens and the "rim intensity (RI)" are maintained constant even when a spherical aberration is corrected by passing a light beam through an expander lens unit before it reaches the objective lens, and which is able to adequately read/write information signals from/to optical recording media, and a read/write apparatus which includes the optical pickup apparatus are provided. The expander lens unit includes a first lens group and a second lens group, and is disposed such that a focal position of the second lens group, which is closer to the objective lens than the first lens group, is on the aperture diaphragm of the objective lens.

16 Claims, 12 Drawing Sheets

OPTICAL PICKUP METHOD AND APPARATUS FOR PERFORMING READ AND WRITE OPERATIONS ON RECORDING MEDIA

BACKGROUND OF THE INVENTION

1. Field of the Invention

The present invention relates to optical pickup apparatuses which read/write information signals from/to optical recording media, such as optical disks, magnetic optical disks, optical cards, etc., and to read/write apparatuses which contain the optical pickup apparatuses and which read/write information signals from/to optical recording media.

2. Description of the Related Art

Optical pickup apparatuses which read/write information signals from/to optical recording media, such as optical disks, etc., have been suggested. In such optical pickup apparatuses, in order to increase the storage capacities of the optical recording media, a laser diode (LD) having a short emission wavelength is often used as a light source.

In addition, in the optical pickup apparatuses, a lens having a high numerical aperture (NA) is used as an objective lens.

For example, compared with optical pickup apparatuses for "Compact Discs (CDs)" (trademark), in which the emission wavelength of the light source is 780 nm, in optical pickup apparatuses for "Digital Versatile Discs (DVDs)" (trademark), the emission wavelength of the light source is 650 nm. Thus, the emission wavelength of the light source is reduced as the recording density is increased. In addition, the numerical aperture (NA) of the objective lens used in the optical pickup apparatuses for Compact Discs (CDs) (trademark) is 0.45, and the numerical aperture (NA) of the objective lens used in the optical pickup apparatuses for Digital Versatile Discs (DVDs) is 0.60. Thus, the numerical aperture (NA) of the objective lens is increased as the recording density is increased.

Recently, an optical pickup apparatus using a blue-violet laser diode, of which the emission wavelength is 405 nm, as the light source and an objective lens having a high numerical aperture (NA) of 0.85 has been suggested.

However, in the case in which the emission wavelength of the light source is reduced and the numerical aperture (NA) of the objective lens is increased, there is a problem in that a wavefront aberration is easily increased due to various manufacturing errors, and the optical performance is degraded.

Accordingly, in order to correct a spherical aberration which occurs due to a thickness error of an optical recording medium and manufacturing errors in the lens, an optical pickup apparatus in which an expander lens unit including two lenses is inserted between the light source and the objective lens has been suggested. In this optical pickup apparatus, the distance between the two lenses included in the expander lens unit can be adjusted.

In addition, the spherical aberration can also be corrected by moving a collimator lens unit, which is used for making a light beam emitted from the light source parallel, along the optical axis.

However, the above-described construction in which the expander lens unit is used for correcting the spherical aberration has the following problems.

In the above-described expander lens unit, when the distance between the two lenses is changed from a designed value, that is, a value at which the light beam emitted from the expander lens unit is made parallel, the light beam emitted from the expander lens unit is either diffused or converged. The total quantity of light incident to the objective lens is limited by an aperture diaphragm disposed near the objective lens. Accordingly, compared with the case in which the light beam is parallel, the total quantity of light incident to the objective lens is increased when the light beam is converged and is reduced when the light beam is diffused.

When the total quantity of light incident to the objective lens changes, the quantity of light radiated on an optical recording medium in the process of reading/writing information signals from/to the optical recording medium also changes. In addition, the quantity of light that is reflected from the optical recording medium and detected by a detector also changes. Accordingly, there is a risk that error signals for implementing various servo operations cannot be adequately detected. In addition, even if the servo operations are stable, in the process of reproducing so-called "RF signals", that is, information signals read out from the optical recording medium, the "RF amplitude" also changes so that data may not be read accurately.

Furthermore, in the case in which the optical recording medium is a so-called "recordable disc", when the quantity of light radiated on the optical recording medium is too high, there is a risk that the information signals recorded on the optical recording apparatus will be destroyed in the reproducing process. On the contrary, when the quantity of light radiated on the optical recording medium is too low, there is a risk that the information signals cannot be recorded on the optical recording medium in the recording process.

The quantity of light is not the only problem. Generally, the light beam incident to the aperture diaphragm of the objective lens is a so-called Gaussian beam, in which the cross-sectional distribution of light intensity has the form of a Gaussian distribution. However, when the light beam incident to the aperture diaphragm is converged or diffused, the used area of the light beam changes. Thus, the so-called "rim intensity (RI)", that is, the light intensity of the peripheral region of the light beam relative to that of the central region thereof, also changes, so that the numerical aperture (NA) of the optical system changes substantially. In such a case, there is a risk that it will be difficult to read/write the information signals from/to the optical recording medium.

The above-described problem also occurs in the case in which the spherical aberration is corrected by moving the collimator lens unit along the optical axis.

SUMMARY OF THE INVENTION

In view of the above-described situation, an object of the present invention is to provide an optical pickup apparatus in which the quantity of light incident to the aperture diaphragm of the objective lens and the "rim intensity (RI)" is maintained constant, even when the spherical aberration is corrected by passing the light beam through an expander lens unit before it reaches the objective lens, and which is able to adequately read/write information signals from/to optical recording media and to provide a read/write apparatus which includes the optical pickup apparatus.

In order to attain the above-described object, according to one aspect of the present invention, an optical pickup apparatus includes a light source, an objective lens which condenses a light beam emitted from the light source on an optical recording medium, and an expander lens unit which includes a first lens group and a second lens group, which is disposed on the optical axis between the objective lens and the light source, and in which the distance between the first and second lens groups is changed so as to correct a spherical aberration which occurs on the optical recording medium. The expander lens unit is disposed such that the focal position of the second lens group, which is closer to the objective lens than the first lens group, at the side closer to the objective lens is on the aperture diaphragm of the objective lens.

Thus, in this optical pickup apparatus, the distance between the expander lens unit and the aperture diaphragm of the objective lens is determined such that the focal position of the second lens group, which is closer to the objective lens than the first lens group, is on the aperture diaphragm of the objective lens. Even when the distance between the first and second lens groups is changed and the light beam emitted from the expander lens unit is thereby diffused or converged, the diameter of the light beam is always the same at the focal position of the second lens group.

At positions away from the focal position of the second lens group, the diameter of the light beam changes as the distance between the first and second lens groups is changed. Accordingly, when the aperture diaphragm of the objective lens is disposed at a position away from the focal position of the second lens group, the quantity of light incident to the aperture diaphragm changes when the spherical aberration is corrected by the expander lens unit.

The distance between the objective lens and the second lens group varies due to a focus servo operation in which the objective lens is moved. However, since a stroke of a focus actuator is normally approximately 2 mm (□}1 mm), when the focal distance of the second lens group is sufficiently large, the change in quantity of light that occurs due to the movement of the objective lens can be ignored.

When the distance between the first and second lens groups of the expander lens unit is adjusted to correct the spherical aberration, it is better to move the first lens group, which is farther from the objective lens, than to move the second lens group. This is because the distance between the aperture diaphragm and the second lens group is preferably maintained as constant as possible.

Each of the first and second lens groups of the expander lens unit may be constructed of a single lens or a plurality of lenses. In the case in which the second lens group is constructed of a plurality of lenses, it should be disposed such that the focal position of the combination of the lenses is on the aperture diaphragm of the objective lens.

In addition, according to another aspect of the present invention, an optical pickup apparatus includes a light source, an objective lens which condenses a light beam emitted from the light source on an optical recording medium, and a collimator lens unit which is disposed on the optical axis between the objective lens and the light source. The collimator lens unit is disposed such that the focal position at the side closer to the objective lens is on the aperture diaphragm of the objective lens.

The above-described descriptions regarding the expander lens unit also apply to the case in which the collimator lens unit is moved along the optical axis so as to correct the spherical aberration. In this case, the aperture diaphragm of the objective lens is disposed on the focal position of the collimator lens unit.

Focal distances of the collimator lens units are often limited by the characteristics of a laser diode (LD) that serves as a light source and by the size of an optical system.

In such a case, in the above-described optical pickup apparatus, the position for disposing the aperture diaphragm of the objective lens is also limited. In order to eliminate such a limit, the collimator lens unit may be constructed of two or more lens groups in which the distance between one of the lenses which is closest to the objective lens and the rest of the lenses can be changed, and the spherical aberration may be corrected by adjusting this distance. In this case, the focal distance of the lens which is closest to the objective lens can be freely determined, so that the position to dispose the aperture diaphragm of the objective lens can also be freely determined.

Accordingly, the quantity of light incident to the objective lens can be made constant irrespective of the state of the expander lens unit or the collimator lens unit, and the quantity of light detected by a detector can be stabilized. Accordingly, servo-error signals can be adequately detected. In addition, in the process of reproducing "RF signals", the "RF amplitude" can also be stabilized so that data can be accurately reproduced. Furthermore, since the quantity of light radiated on the optical recording medium is stabilized, information signals can be adequately read/written from/to the optical recording medium.

Furthermore, since the diameter of the light beam, which is increased by the above-described expander lens unit, is constant at the focal position of the second lens group irrespective of the state of the expander lens unit, the "rim intensity (RI)" and the numerical aperture (NA) do not change.

Thus, according to the optical pickup apparatus of the present invention, even when the spherical aberration is corrected using the expander lens unit or the collimator lens unit, the change in quantity of light and "rim intensity (R)" can be prevented.

In addition, according to another aspect of the present invention, a read/write apparatus comprises an optical pickup apparatus, and an optical recording medium supporting unit which supports an optical recording medium in such a manner that the optical pickup apparatus is able to read/write information signals from/to the optical recording medium. The optical pickup apparatus includes a light source, an objective lens which condenses a light beam emitted from the light source on the optical recording medium, and an expander lens unit which includes a first lens group and a second lens group, which is disposed on the optical axis between the objective lens and the light source, and in which the distance between the first and second lens groups is changed so as to correct a spherical aberration which occurs on the optical recording medium, and the expander lens unit is disposed such that the focal position of the second lens group, which is closer to the objective lens than the first lens group, at the side closer to the objective lens is on the aperture diaphragm of the objective lens.

In addition, according to another aspect of the present invention, a read/write apparatus comprises an optical pickup apparatus, and an optical recording medium supporting unit which supports an optical recording medium in such a manner that the optical pickup apparatus is able to read/write information signals from/to the optical recording medium. The optical pickup apparatus includes a light source, an objective lens which condenses a light beam emitted from the light source on the optical recording medium, and a collimator lens unit which is disposed on the optical axis between the objective lens and the light source, and the collimator lens unit is disposed such that the focal position at the side closer to the objective lens is on the aperture diaphragm of the objective lens.

Thus, according to the present invention, when the spherical aberration is corrected by moving one of the lenses in the expander lens unit or the collimator lens unit, the quantity of light incident to the objective lens can be maintained constant irrespective of the operation for correcting the spherical aberration. In addition, since a large aberration can also be corrected, the tolerance for the thickness error of the recording media and manufacturing errors in the objective lens can be increased.

In addition, information signals can be adequately and reliably read/written from/to the optical recording medium without adjusting the quantity of light emitted from the light source.

More specifically, according to the present invention, an optical pickup apparatus, in which the quantity of light incident to the aperture diaphragm of the objective lens and the "rim intensity (RI)" are maintained constant even when the spherical aberration is corrected by passing the light beam through an expander lens unit before it reaches the objective lens, and which is able to adequately read/write information signals from/to optical recording media, and a read/write apparatus which includes the optical pickup apparatus can be provided.

DESCRIPTION OF THE PREFERRED EMBODIMENTS

Embodiments of the present invention will be described below in detail with reference to the accompanying drawings.

First Embodiment

Figure 1:
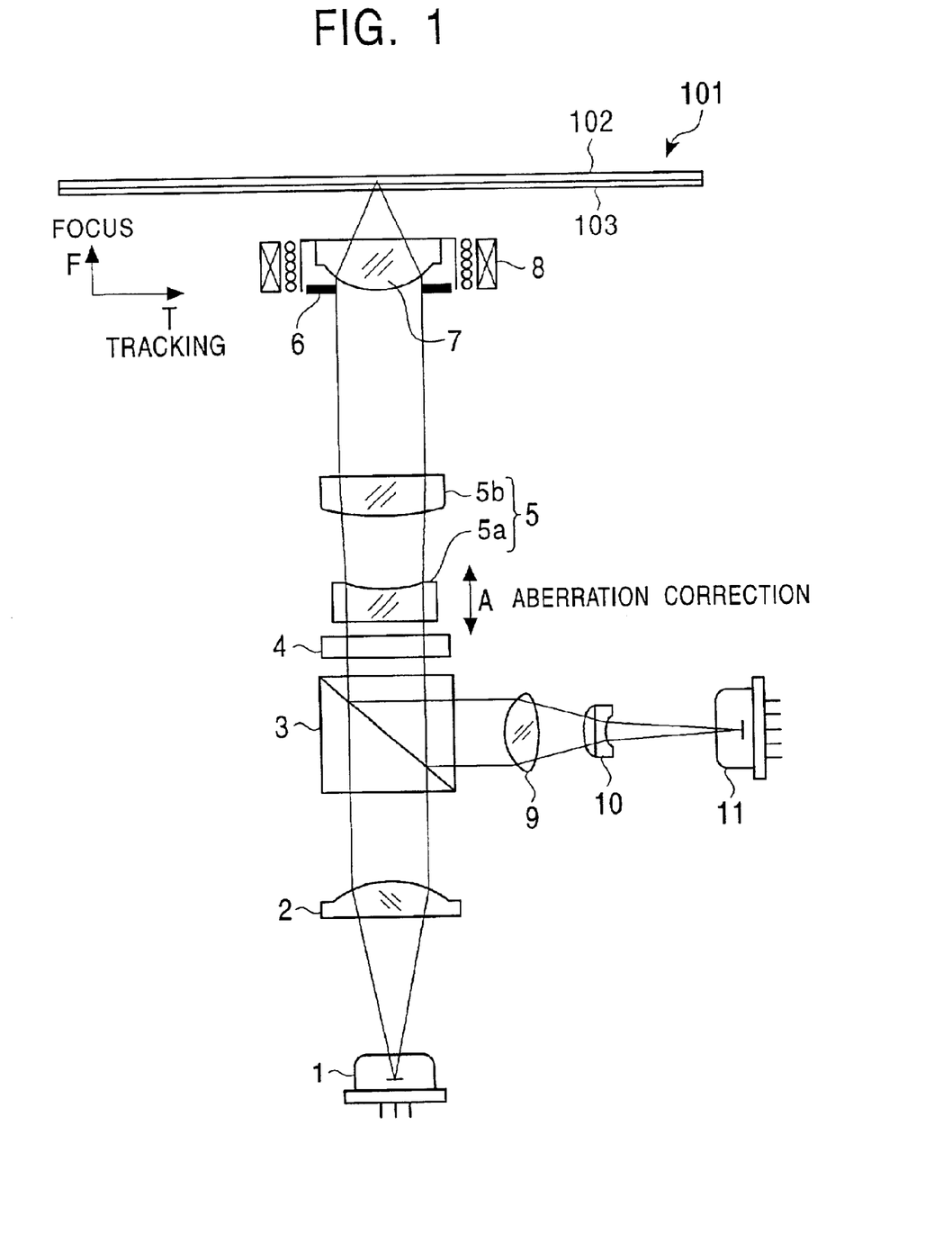
FIG. 1 is a side view showing a construction of an optical pickup apparatus according to a first embodiment of the present invention.

As shown in FIG. 1, an optical pickup apparatus according to a first embodiment of the present invention includes a laser diode (LD) 1 which functions as a light source. A light beam emitted from the laser diode (LD) 1 is collimated by a collimator lens unit 2 and becomes a plane wave (parallel light beam). This plane wave passes through a polarization beam splitter 3 and a quarter-wave plate 4 and is incident to an expander lens unit 5. The expander lens unit 5 includes a first lens group 5a and a second lens group 5b, and each of the first and second lens groups 5a and 5b may be constructed of a single lens or a plurality of lenses. According to the first embodiment, the first lens group 5a includes at least one concave lens, and the second lens group 5b includes at least one convex lens.

The expander lens unit 5 increases the diameter of the light beam by passing the light beam therethrough. Then, the light beam passes through an aperture diaphragm 6 and is incident to an objective lens 7. The objective lens 7 is retained by a two-axis actuator 8 in a moveable manner, and the two-axis actuator 8 is able to move the objective lens 7 in a focus direction (direction along the optical axis), which is shown by the arrow F in FIG. 1, and in a tracking direction (direction perpendicular to the optical axis), which is shown by the arrow T in FIG. 1.

The aperture diaphragm 6 may be fixed to an optical system; or be attached to the two axis actuator 8 and moved along with the objective lens 7. The expander lens unit 5 is disposed such that the focal position of the second lens group 5b, which is disposed closer to the objective lens 7 than the first lens unit 5a, is on the aperture diaphragm 6.

The light beam incident to the objective lens 7 is condensed on a signal-recording surface 103 of an optical recording medium 101, such as an optical disc, a magnetic optical disk, etc. The optical recording medium 101 includes a substrate 102; and is constructed by forming the signal-recording surface 103 on the substrate 102.

The light beam condensed on the signal-recording surface 103 of the optical recording medium 101 by the objective lens 7 is reflected from the signal-recording surface 103 and returns to the polarization beam splitter 3. Then, the path of the reflected light beam is split from the path from the polarization beam splitter 3 to the laser diode (LD) 1, and the reflected light beam passes through a focusing lens 9 and a multi-lens 10 and reaches a photodetector 11. Output signals of the photodetector 11 represent the signals read from the optical recording medium 101, and various error signals, such as focus error signals and tracking error signals, can be generated based on the output signals of the photodetector 11. The multi-lens 10 is a lens that includes a cylindrical surface and a concave surface.

A read/write apparatus according to the present invention includes the above-described optical pickup apparatus and an optical recording medium supporting unit (not shown) which supports the optical recording medium 101 in such a manner that the optical pickup apparatus is able to read/write information signals from/to the optical recording medium 101. In the case in which the optical recording medium 101 is a disc-type recording medium, the optical recording medium supporting unit is constructed of a rotating device which retains the optical recording medium 101 at the central portion thereof in a rotatable manner.

In the above-described optical pickup apparatus, when there is no aberration in the optical system, the light beam incident to the first lens group 5a of the expander lens unit 5 leaves as a parallel wave after the diameter thereof is increased by the expander lens unit 5.

When there is an aberration in the optical system, the first lens group 5a is moved along the optical axis, as shown by the arrow A in FIG. 1, so that the distance between the first and second lens groups 5a and 5b is changed and the spherical aberration is corrected. When the spherical aberration is corrected in this manner, the light beam emitted from the expander lens unit 5 is diffused or converged.

In this optical pickup apparatus, since the aperture diaphragm 6 is positioned at the focal position of the second lens group 5b, the quantity of light that passes through the aperture diaphragm 6 and is incident to the objective lens 7 does not change even when the spherical aberration is corrected as described above. Accordingly, in this optical pickup apparatus, the information signals can be adequately read/written from/to the optical recording medium 101.

Figure 2:
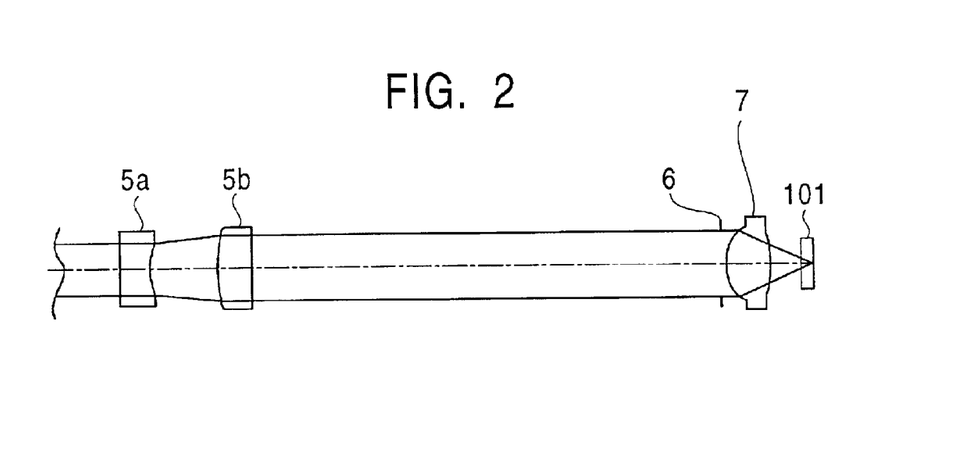
FIG. 2 is a side view showing a construction of an expander lens unit, which includes a first lens group (concave) and a second lens group (convex), contained in the optical pickup apparatus.
Figure 3A:
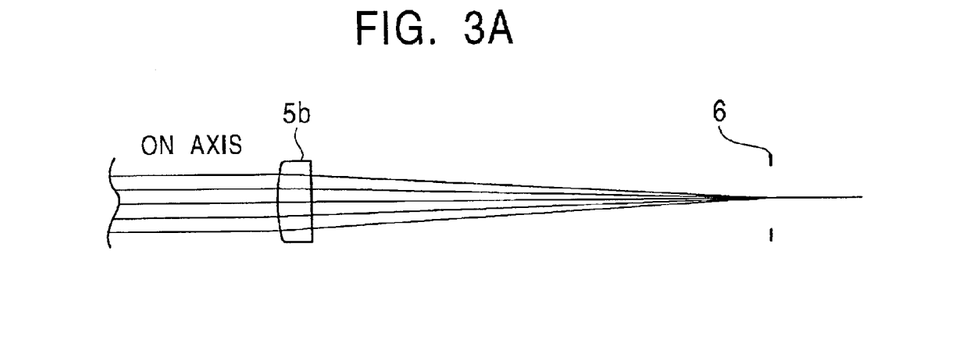
FIGS. 3A and 3B are side views showing a focal position of the second lens group (convex) in the expander lens unit.
Figure 3B:
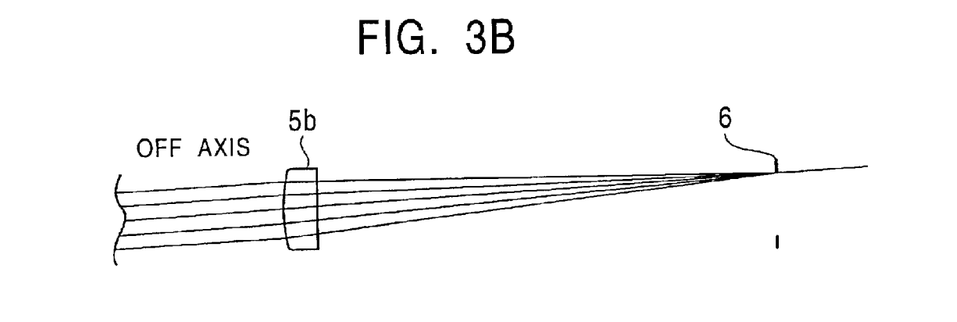

As shown in FIG. 2, in this optical pickup apparatus, the expander lens unit 5 is constructed of the first lens group 5a, which includes at least one concave lens, and the second lens group 5b, which includes at least one convex lens. The light beam is parallel in regions in front and rear of the expander lens unit 5. The aperture diaphragm 6 of the objective lens 7 is positioned at the focal position of the second lens group 5b. As shown in FIGS. 3A and 3B, the focal position of the second lens group 5b is the position of a focal plane, that is, a plane including a focal point of parallel light incident to the second lens group 5b. As shown in FIG. 3B, the focal position does not change even when the parallel light is off the axis, that is, when the parallel light is incident from the direction inclined from the axis by a small angle.

Figure 4A:
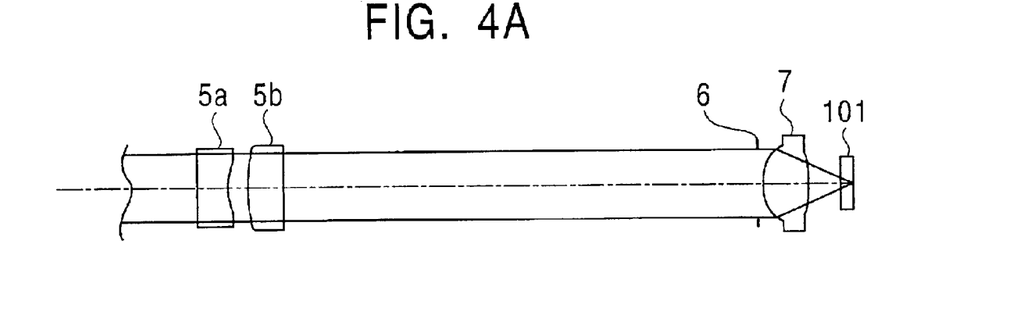
FIGS. 4A and 4B are side views showing a manner in which the first lens group (concave) is moved toward the second lens group (convex) in the optical pickup apparatus.
Figure 4B:
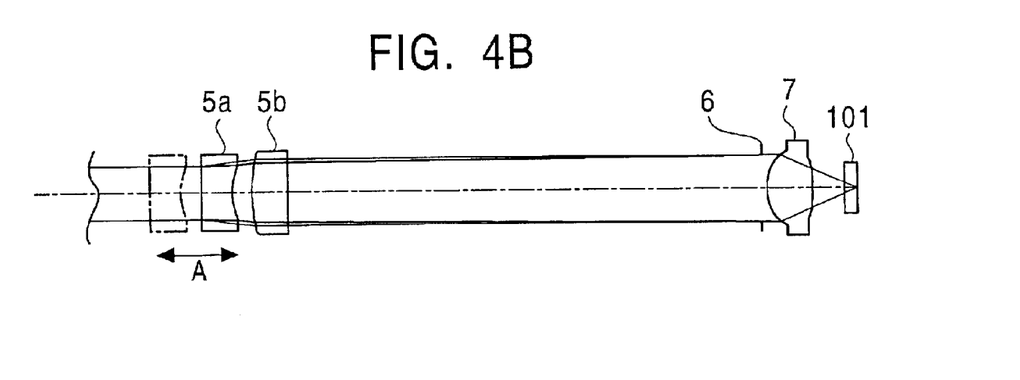
Figure 5:
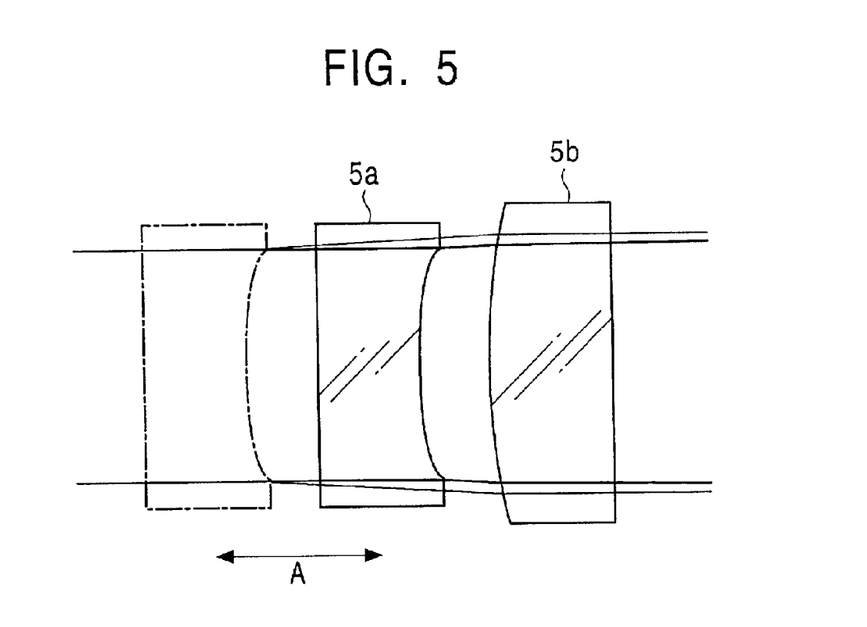
FIG. 5 is a side view showing a manner in which the first lens group (concave) is moved toward the second lens group (convex) in the expander lens unit.

The case is considered in which the first lens group 5a in the initial state shown in FIG. 2 (the state in which the aberration is not corrected) is moved along the optical axis so as to correct the aberration. When the first lens group 5a is moved toward the second lens group 5b, as shown in FIGS. 4A, 4B, and 5, the light beam emitted from the expander lens unit 5 is diffused. However, as is understood from FIGS. 4A, 4B, and 5, at the focal position of the second lens group 5b, the diameter of the light beam is the same as that in the state shown in FIG. 2 (the state in which the aberration is not corrected). More specifically, as shown in FIGS. 4A, 4B, and 5, paths of the light beam incident to the expander lens unit 5 at a predetermined distance from the axis thereof before and after the first lens unit 5a is moved are parallel to each other in the area between the first lens unit 5a and the second lend unit 5b. Accordingly, the paths of the light beam before and after the first lens group 5a is moved are at the same distance from the axis of the light beam at the focal position of the second lens group 5b.

Figure 6A:
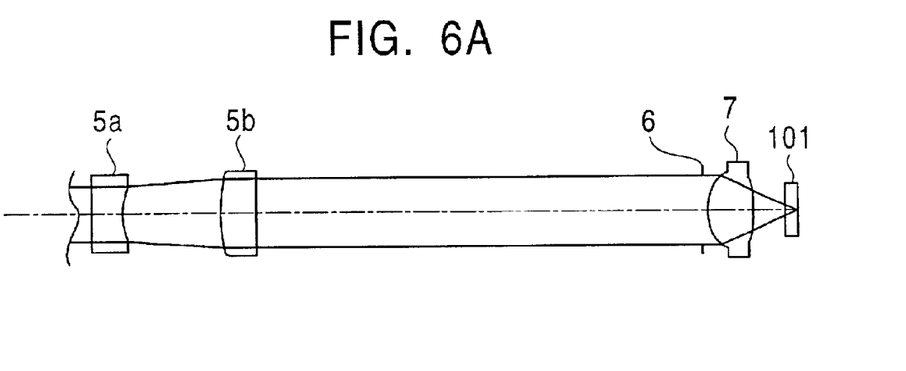
FIGS. 6A and 6B are side views showing a manner in which the first lens group (concave) is moved away from the second lens group (convex) in the optical pickup apparatus.
Figure 6B:
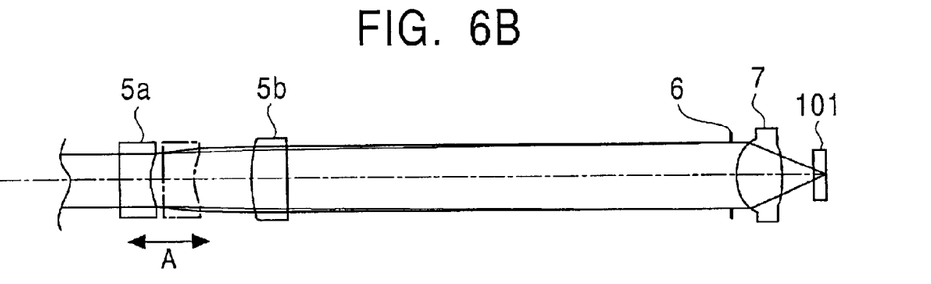
Figure 7:
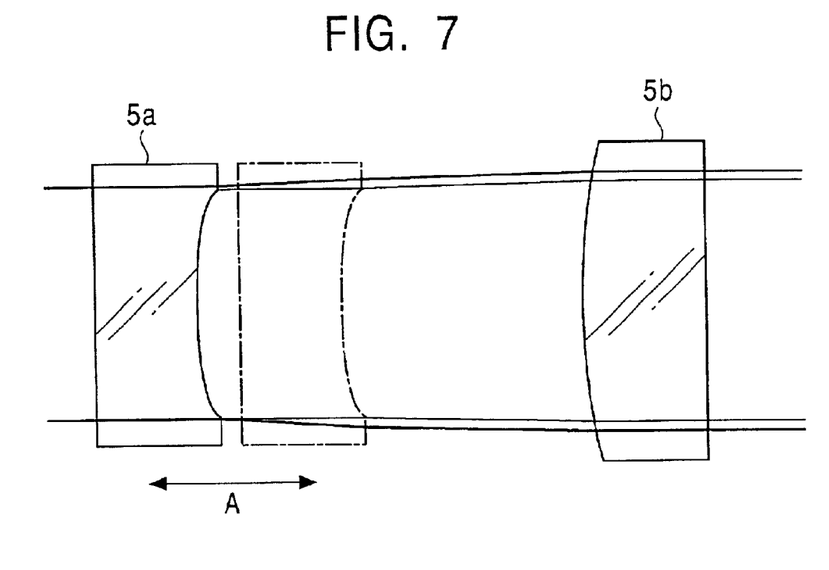
FIG. 7 is a side view showing a manner in which the first lens group (concave) is moved away from the second lens group (convex) in the expander lens unit.

When the first lens group 5a is moved away from the second lens group 5b, as shown in FIGS. 6A, 6B, and 7, the light beam emitted from the expander lens unit 5 is converged. However, due to the same reason, at the focal position of the second lens group 5b, the diameter of the light beam is the same as that in the state shown in FIG. 2 (the state in which the aberration is not corrected).

As is understood from the foregoing descriptions, even when the aberration is corrected, the quantity of light incident to the aperture diaphragm 6 of the objective lens 7 and the "rim intensity (RI)" do not change.

Second Embodiment

Figure 8:
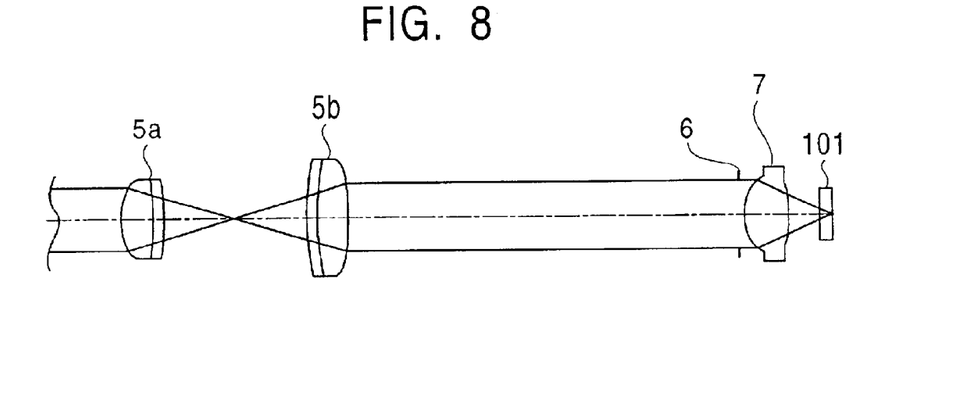
FIG. 8 is a side view showing a construction of an expander lens unit, which includes a first lens group (convex) and a second lens group (convex), contained in an optical pickup apparatus according to a second embodiment.
Figure 9A:
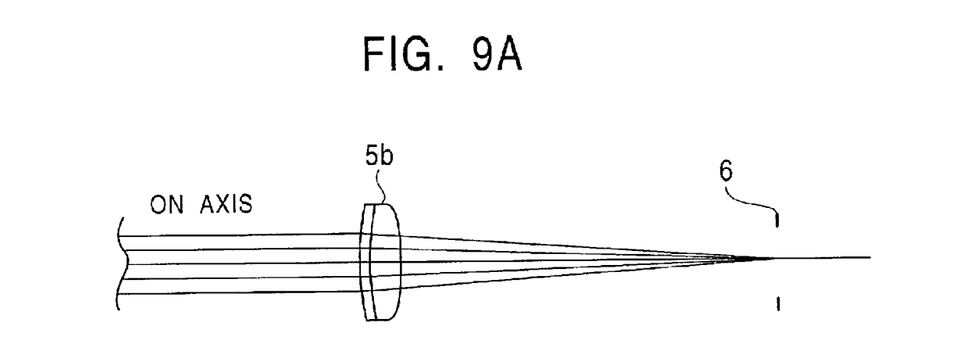
FIGS. 9A and 9B are side views showing a focal position of the second lens group (convex) in the expander lens unit.
Figure 9B:
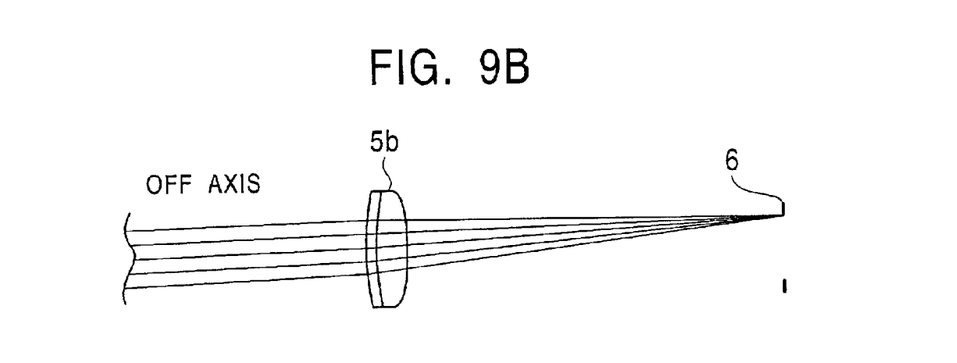

As shown in FIG. 8, according to the present invention, both the first lens group 5a and the second lens group 5b of the expander lens unit 5 may be constructed of one or more convex lenses. Also in this case, the light beam is parallel in regions in front and rear of the expander lens unit 5. The aperture diaphragm 6 of the objective lens 7 is positioned at the focal position of the second lens group 5b. As shown in FIGS. 9A and 9B, the focal position of the second lens group 5b is the position of a focal plane, that is, a plane including a focal point of parallel light incident to the second lens group 5b. As shown in FIG. 9B, the focal position does not change even when the parallel light is off the axis, that is, when the parallel light is incident from the direction inclined from the axis by a small angle.

Figure 10A:
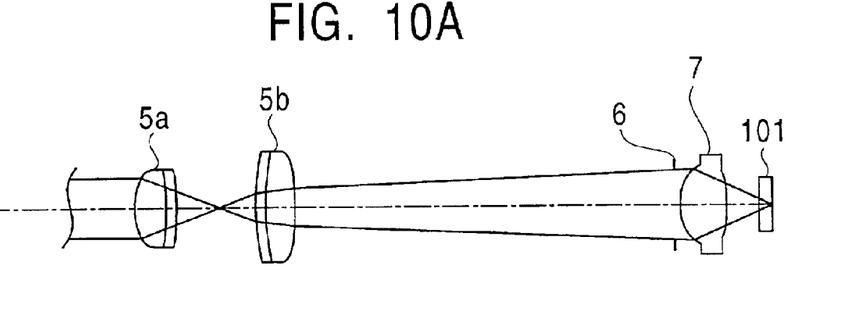
FIGS. 10A and 10B are side views showing a manner in which the first lens group (convex) is moved toward the second lens group (convex) in the optical pickup apparatus.
Figure 10B:
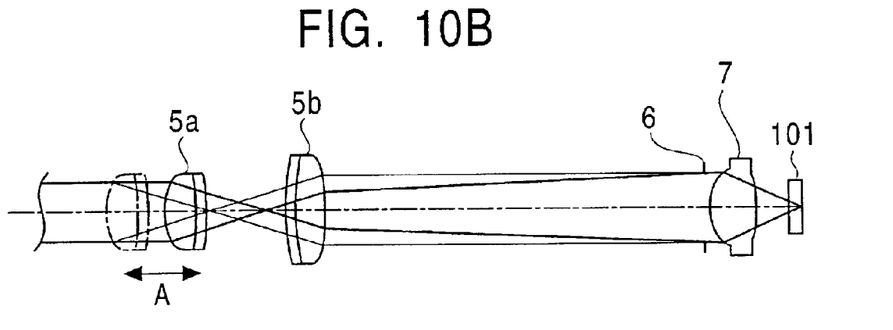
Figure 11:
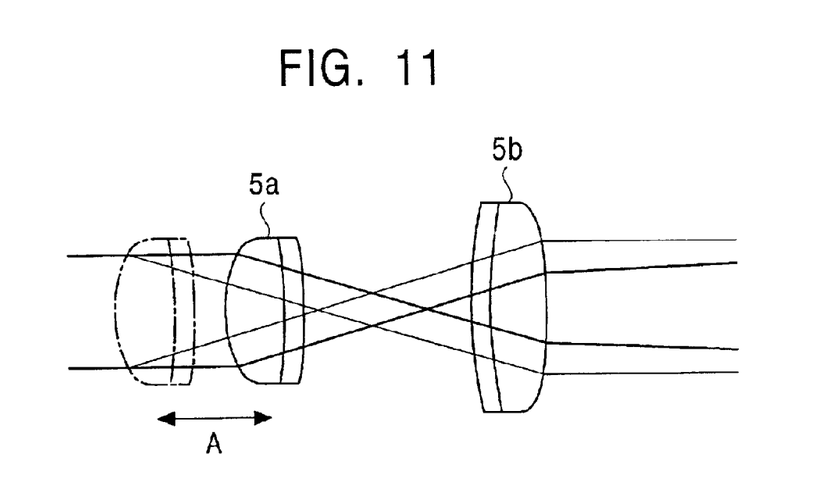
FIG. 11 is a side view showing a state in which the first lens group (convex) is moved toward the second lens group (convex) in the expander lens unit.

The case is considered in which the first lens group 5a in the initial state shown in FIG. 8 (the state in which the aberration is not corrected) is moved along the optical axis so as to correct the aberration. When the first lens group 5a is moved toward the second lens group 5b, as shown in FIGS. 10A, 10B, and 11, the light beam emitted from the expander lens unit 5 is diffused. However, as is understood from FIGS. 10A, 10B, and 11, at the focal position of the second lens group 5b, the diameter of the light beam is the sane as that in the state shown in FIG. 8 (the state in which the aberration is not corrected). More specifically, as shown in FIGS. 10A, 10B, and 11, the paths of the light beam incident to the expander lens unit 5 at a predetermined distance from the axis thereof before and after the first lens unit 5a is moved are parallel to each other in the area between the first lens unit 5a and the second lend unit 5b. Accordingly, the paths of the light beam before and after the first lens group 5a is moved are at the same distance from the axis of the light beam at the focal position of the second lens group 5b.

Figure 12A:
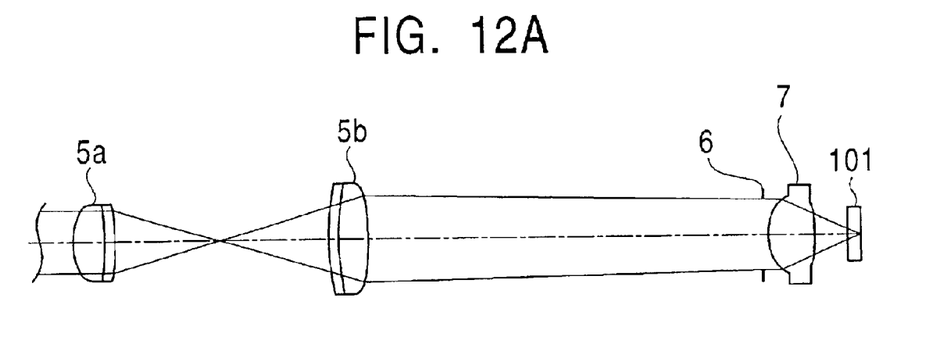
FIGS. 12A and 12B are side views showing a manner in which the first lens group (convex) is moved away from the second lens group (convex) in the optical pickup apparatus.
Figure 12B:
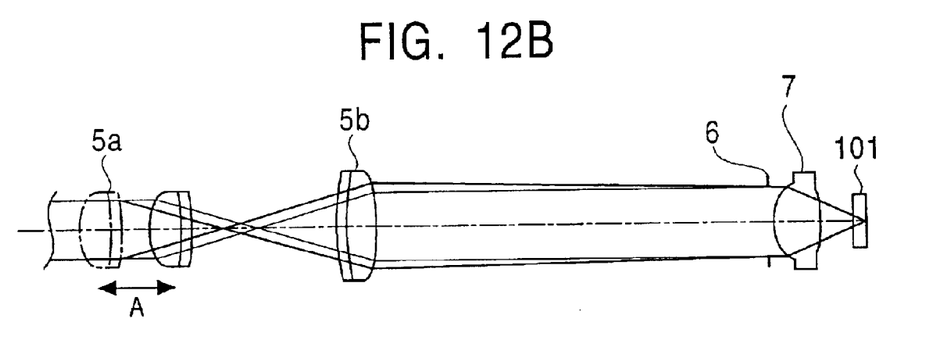
Figure 13:
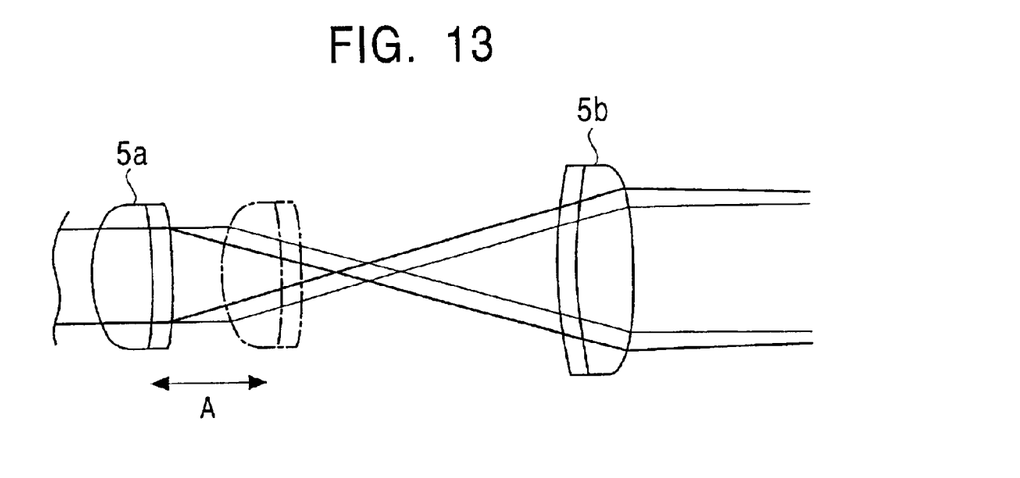
FIG. 13 is a side view showing a state in which the first lens group (convex) is moved away from the second lens group (convex) in the expander lens unit.

When the first lens group 5a is moved away from the second lens group 5b, as shown in FIGS. 12A, 12B, and 13, the light beam emitted from the expander lens unit 5 is converged. However, due to the same reason, at the focal position of the second lens group 5b, the diameter of the light beam is the same as that in the state shown in FIG. 8 (the state in which the aberration is not corrected).

As is understood from the foregoing descriptions, even when the aberration is corrected, the quantity of light incident to the aperture diaphragm 6 of the objective lens 7 and the "rim intensity (RI)" do not change.

In the above-described first and second embodiments, the first lens group 5a is moved along the optical axis. Accordingly, the distance between the aperture diaphragm 6 of the objective lens 7 and the second lens group 5b is maintained constant.

The aberration can also be corrected by moving the second lens group 5b along the optical axis. In such a case, when the second lens group 5b must be moved a large distance for correcting the aberration, there is the problem that the distance between the aperture diaphragm 6 of the objective lens 7 and the second lens group 5b changes. However, when the focal distance of the second lens group 5b is sufficiently large relative to the amount by which the second lens group 5b is moved, the change in quantity of light incident to the objective lens 7 due to the movement of the second lens group 5b can be made small enough to be ignored.

In addition, in the above-described first and the second embodiments, the light beam incident to the first lens group 5a is parallel and the optical system is constructed as an infinite system. However, the optical pickup apparatus may also be constructed as a finite system, in which the quantity of light incident to the objective lens 7 does not change substantially.

Third Embodiment

Figure 14:
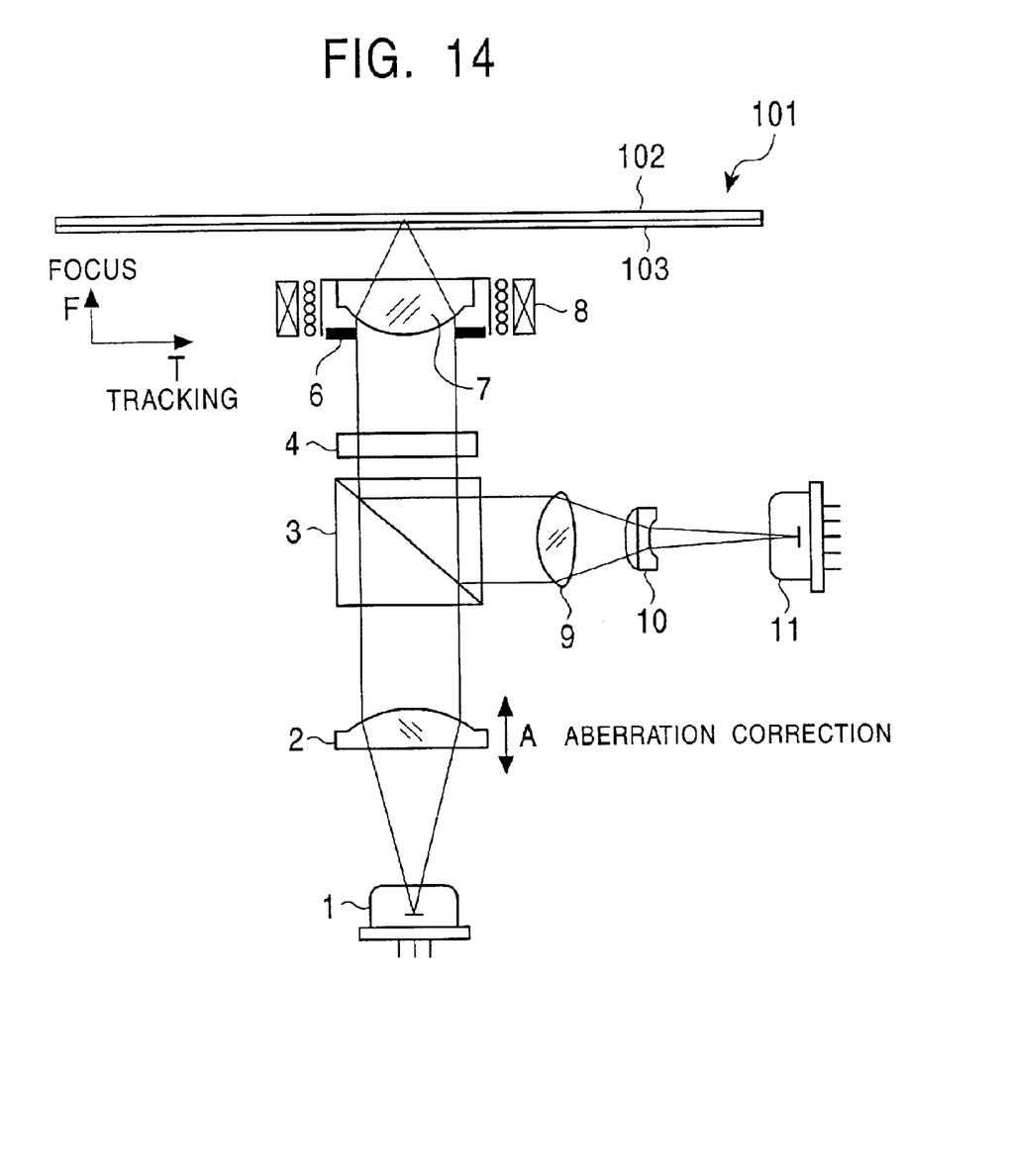
FIG. 14 is a side view showing a construction of an optical pickup apparatus according to a third embodiment of the present invention, in which an expander lens unit is not included.

As shown in FIG. 14, the optical pickup apparatus may also be constructed such that the spherical aberration is corrected without using the expander lens unit by moving a collimator lens unit 2 along the optical axis.

According to a third embodiment, an optical pickup apparatus includes a laser diode (LD) 1 which functions as a light source. A light beam emitted from the laser diode (LD) 1 is collimated by a collimator lens unit 2 and becomes a plane wave (parallel light beam). This plane wave passes through a polarization beam splitter 3, a quarter-wave plate 4, and an aperture diaphragm 6, and is incident to an objective lens 7. The objective lens 7 is retained by a two-axis actuator 8 in a moveable manner, and the two-axis actuator 8 is able to move the objective lens 7 in a focus direction (direction along the optical axis), which is shown by the arrow F in FIG. 14, and in a tracking direction (direction perpendicular to the optical axis), which is shown by the arrow T in FIG. 14.

The aperture diaphragm 6 may be fixed to the optical system, or attached to the two-axis actuator 8 and moved along with the objective lens 7. The aperture diaphragm 6 is positioned at the focal position of the collimator lens unit 2 at the side closer to the objective lens 7.

The light beam incident to the objective lens 7 is condensed on a signal-recording surface 103 of an optical recording medium 101, such as an optical disc, a magnetic optical disk, etc. The optical recording medium 101 includes a substrate 102; and is constructed by forming the signal-recording surface 103 on the substrate 102.

The light beam condensed on the signal-recording surface 103 of the optical recording medium 101 by the objective lens 7 is reflected from the signal-recording surface 103 and returns to the polarization beam splitter 3. Then, the path of the reflected light beam is split from the path from the polarization beam splitter 3 to the laser diode (LD) 1, and the reflected light beam passes through a focusing lens 9 and a multi-lens 10 and reaches a photodetector 11. Output signals of the photodetector 11 represent the signals read from the optical recording medium 101, and various error signals, such as focus error signals and tracking error signals, can be generated based on the output signals of the photodetector 11. The multi-lens 10 is a lens that includes a cylindrical surface and a concave surface.

Figure 15:
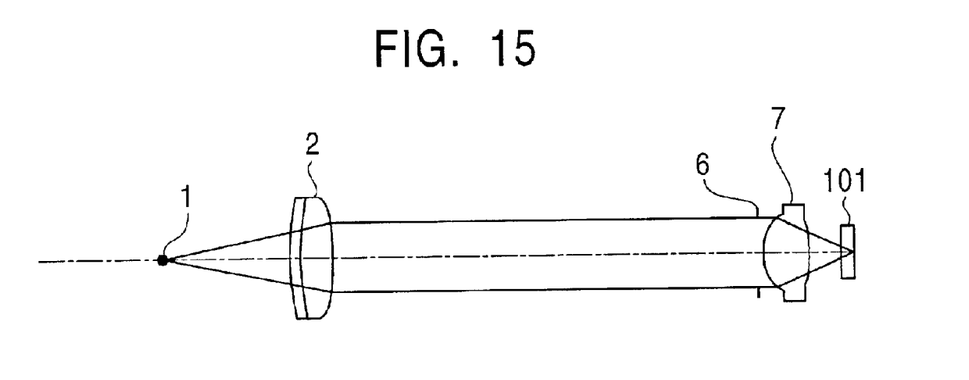
FIG. 15 is a side view showing the positional relationship between a light source and a collimator lens unit in the optical pickup apparatus.

In this optical pickup apparatus, the collimator lens unit 2 is moved along the optical axis for correcting the spherical aberration. In this case, since the aperture diaphragm 6 of the objective lens 7 is positioned at the focal position of the collimator lens unit 2, as shown in FIG. 15, even when the aberration is corrected, the quantity of light incident to the objective lens 7 does not change. Accordingly, the information signals can be adequately read/written from/to the optical recording medium 101.

Figure 16A:
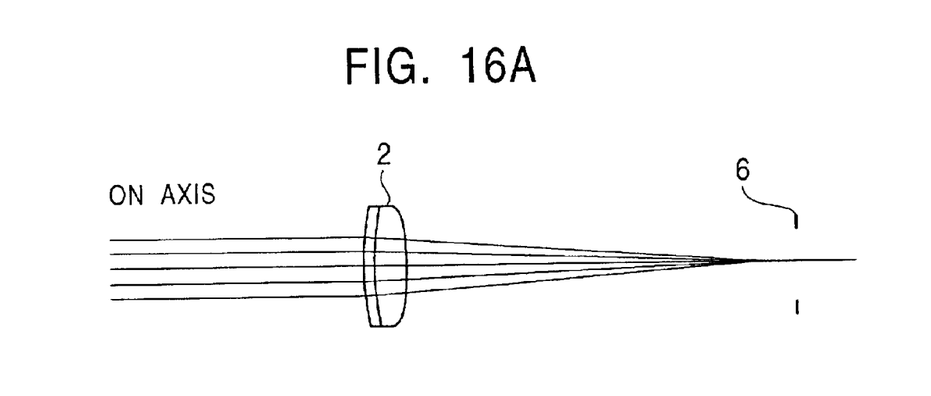
FIGS. 16A and 16B are side views showing a focal position of the collimator lens unit.
Figure 16B:
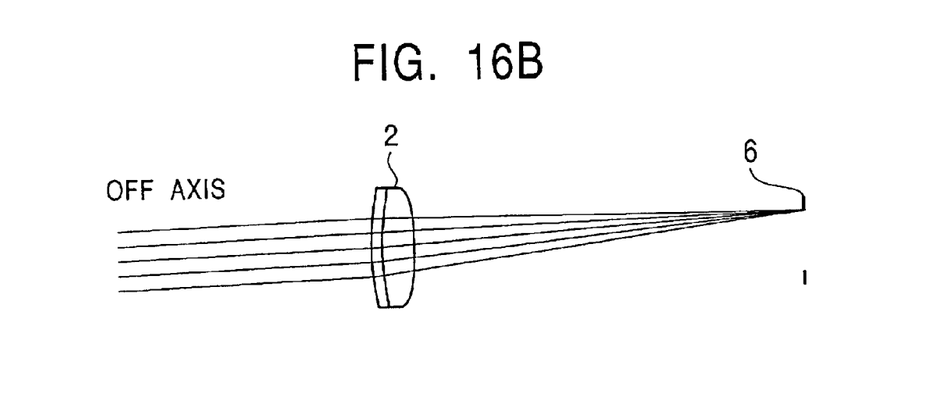

In addition, in this optical pickup apparatus, as shown in FIG. 15, the collimator lens unit 2 is constructed of a convex doublet lens, and the aperture diaphragm 6 is disposed at the focal position of the collimator lens unit 2. As shown in FIGS. 16A and 16B, the focal position of the collimator lens unit 2 is the position of a focal plane, that is, a plane including a focal point of parallel light incident to the collimator lens unit 2.

Figure 17A:
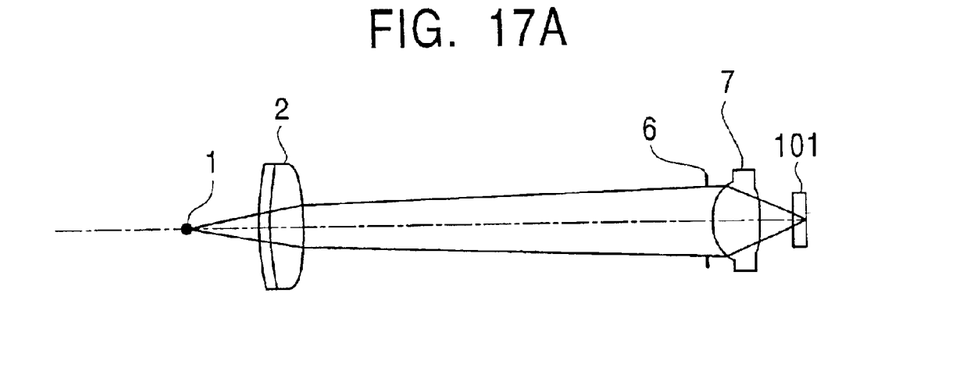
FIGS. 17A and 17B are side views showing a manner in which the light source is moved toward the collimator lens unit in the optical pickup apparatus.
Figure 17B:
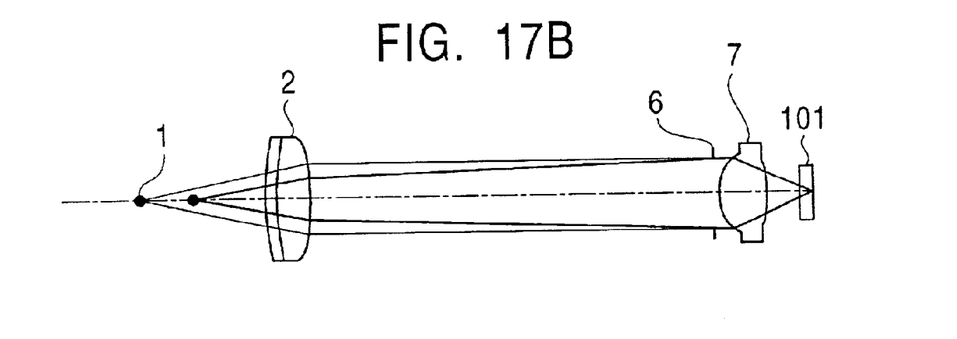
Figure 18:
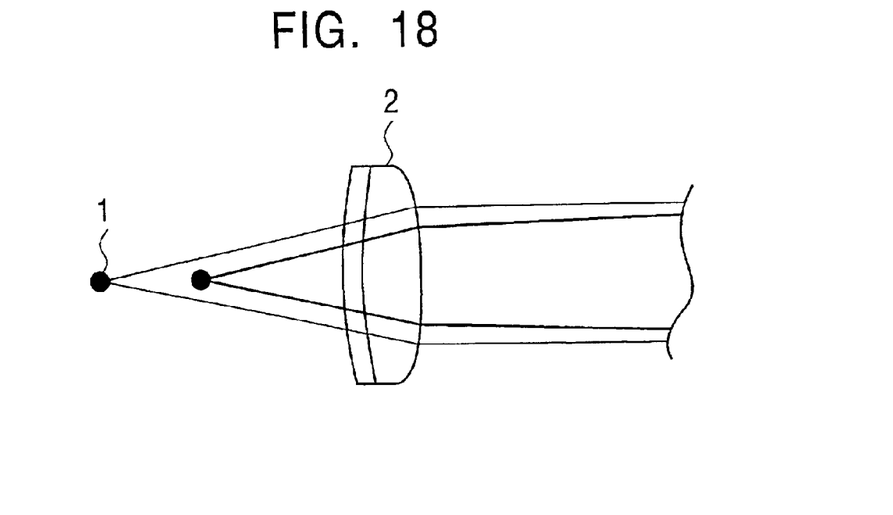
FIG. 18 is a side view showing a manner in which the light source is moved toward the collimator lens unit in the optical pickup apparatus.
Figure 19A:
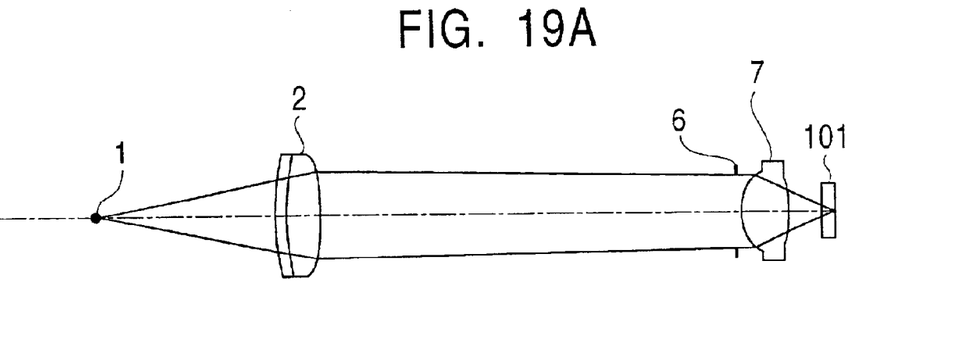
FIGS. 19A and 19B are side views showing a manner in which the light source is moved away from the collimator lens unit in the optical pickup apparatus.
Figure 19B:
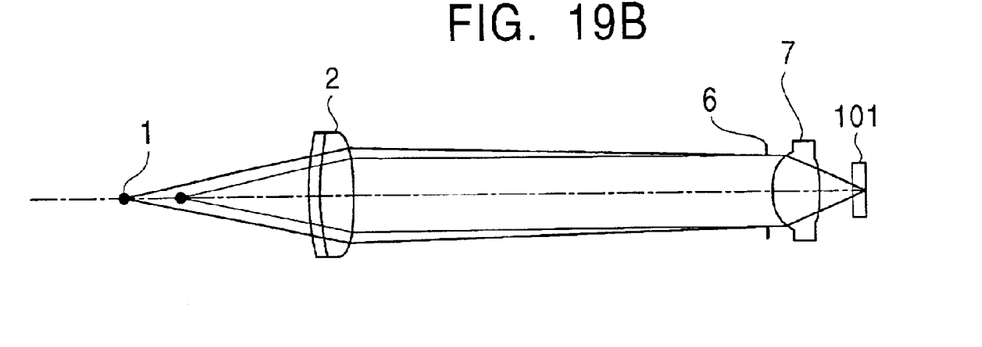
Figure 20:
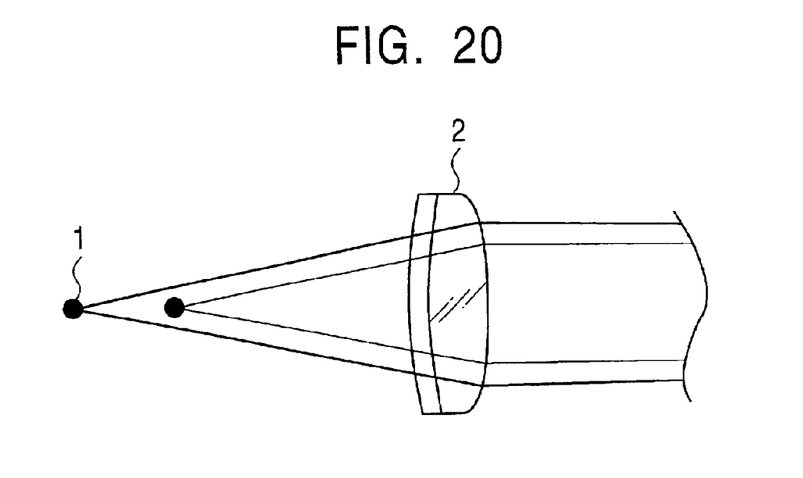
FIG. 20 is a side view showing a manner in which the light source is moved away from the collimator lens unit in the optical pickup apparatus.

The case is considered in which the collimator lens unit 2 in the initial state shown in FIG. 15 (the state in which the aberration is not corrected) is moved along the optical axis so as to correct the aberration. When the collimator lens unit 2 is moved toward the laser diode (LD) 1, as shown in FIGS. 17A, 17B, and 18, the light beam emitted from the collimator lens unit 2 is diffused. However, at the focal position of the collimator lens unit 2, the diameter of the light beam is the same as that in the state shown in FIG. 15 (the state in which the aberration is not corrected). When the collimator lens unit 2 is moved away from the laser diode (LD) 1, as shown in FIGS. 19A, 19B, and 20, the light beam emitted from the collimator lens unit 2 is converged. However, at the focal position of the collimator lens unit 2, the diameter of the light beam is the same as that in the state shown in FIG. 15 (the state in which the aberration is not corrected).

With reference to FIGS. 17A to 20, the laser diode (LD) 1 is moved relative to the collimator lens unit 2. When the laser diode (LD) 1 is moved, the light beam incident to the collimator lens unit 2 moves in parallel as the laser diode (LD) 1 moves, so that the diameter of the light beam is maintained exactly constant at the focal position of the collimator lens unit 2. When the collimator lens unit 2 is moved, the distance between the aperture diaphragm 6 of the objective lens 7 and the collimator lens unit 2 changes. However, effects of the movement of the collimator lens unit 2 can be ignored if the displacement is sufficiently small relative to the focal distance of the collimator lens unit 2. Accordingly, the same effect can be obtained even when the collimator lens unit 2 is moved.

Accordingly, the quantity of light incident to the aperture diaphragm 6 of the objective lens 7 and the "rim intensity (RI)" do not change.

As described above, when the collimator lens unit 2 is moved, the focal position of the collimator lens unit 2 is displaced from the position of the aperture diaphragm 6 of the objective lens 7. Thus, the collimator lens unit 2 cannot be moved a large distance. However, by setting the position of the aperture diaphragm 6 of the objective lens 7 to the focal position of the collimator lens unit 2, the collimator lens unit 2 can be moved in the range in which the change in quantity of light incident to the aperture diaphragm 6 is allowable.

Figure 21:
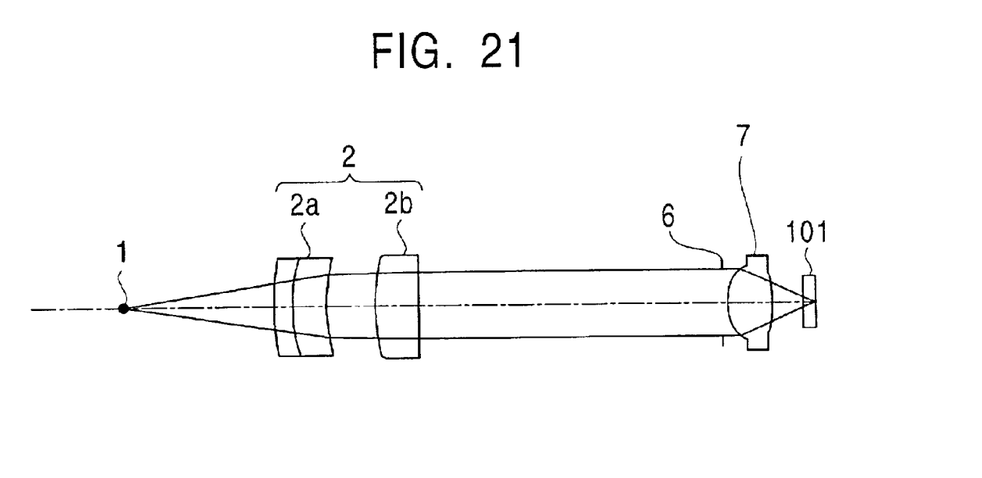
FIG. 21 is a side view showing a construction of an optical pickup apparatus containing a collimator lens unit including a plurality of lenses.

In the above-described third embodiment, the collimator lens unit 2 is constructed of a single lens unit that includes two lenses. However, the collimator lens unit 2 may also be constructed of two lens groups that including includes two lenses or a larger number of lenses, as shown in FIG. 21. In such a case, the aperture diaphragm 6 of the objective lens 7 should be disposed on the focal position of the last lens 2b, which is the lenses included in the collimator lens unit 2 that is closest to the objective lens 7. In this case, the last lens 2b can be freely designed, and the distance between the aperture diaphragm 6 of the objective lens 7 and the last lens 2b can be set freely.

As described above, either one of the collimator lens unit 2 and the laser diode (LD) 1 may be moved along the optical axis. In either case, the aperture diaphragm 6 of the objective lens 7 is positioned at the focal position of the collimator lens unit 2.

In the above-described embodiments, in order to perform a focus-servo operation, the objective lens 7 is moved along the optical axis by the amount corresponding to a stroke of a focus actuator. However, normally, the displacement of the objective lens 7 due to the focus-servo operation is approximately 2 mm (□}1 mm). Thus, when the focal distance of the second group 5b or the last lens 2b is sufficiently large, the change in quantity of light incident to the objective lens 7 that occurs due to the movement of the objective lens 7 in the focus-servo operation can be ignored.

Figure 22:
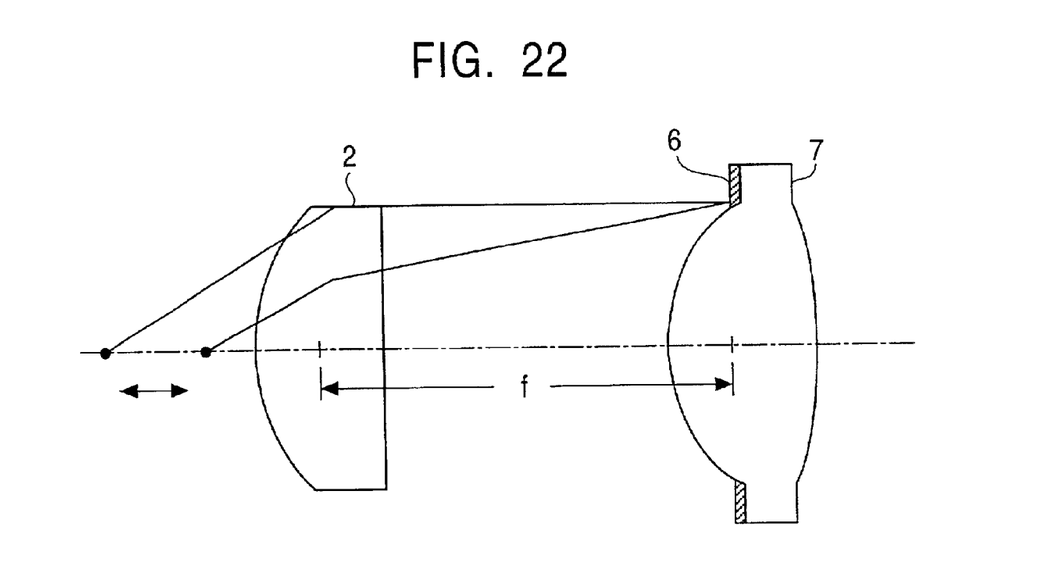
FIG. 22 is a side view showing a construction of an aperture diaphragm formed integrally with an objective lens.

In addition, as shown in FIG. 22, the aperture diaphragm 6 can be formed integrally with a frame portion of the objective lens 7. Also in this case, when the focal distance of the second lens group 5b or the last lens 2b is sufficiently large, the change in quantity of light incident to the objective lens 7 that occurs due to the movement of the aperture diaphragm 6 in the focus-servo operation can be ignored.

What is claimed is:

1. An optical pickup apparatus comprising:
   a light source;
   an objective lens which condenses a light beam emitted from the light source on an optical recording medium; and
   an expander lens unit which includes an adjustable first lens group and an adjustable second lens group, which is disposed on the optical axis between the objective lens and the light source, and in which the distance between the adjustable first and second lens groups is changed so as to correct a spherical aberration which occurs on the optical recording medium,
   wherein the expander lens unit is disposed such that a focal position of the adjustable second lens group, which is closer to the objective lens than the first lens group, at the side closer to the objective lens is on an aperture diaphragm of the objective lens.

2. The optical pickup apparatus according to claim 1, wherein at least one of the adjustable first and second lens groups includes a plurality of lenses.

3. The optical pickup apparatus according to claim 1, wherein, when the distance between the adjustable first and second lens groups of the expander lens unit is changed, the distance between the adjustable second lens group and the aperture diaphragm of the objective lens is maintained constant and the adjustable first lens group is moved.

4. The optical pickup apparatus according to claim 3, wherein at least one of the adjustable first and second lens groups includes a plurality of lenses.

5. An optical pickup apparatus comprising:
   a light source;
   an objective lens which condenses a light beam emitted from the light source on an optical recording medium; and
   a collimator lens unit which is disposed on the optical axis between the objective lens and the light source,
   wherein the collimator lens unit is disposed such that a focal position at the side closer to the objective lens is on an aperture diaphragm of the objective lens, and
   wherein the collimator lens unit includes at least two lenses that are moved together as a single unit along the optical axis to correct a spherical aberration that occurs on the optical recording medium.

6. The optical pickup apparatus according to claim 5, wherein the collimator lens unit includes two or more lens groups.

7. The optical pickup apparatus of claim 5, wherein when the light source is moved along the optical axis and the quantity of light incident to the objective lens remains constant.

8. A read/write apparatus comprising:
   an optical pickup apparatus; and
   optical recording medium supporting means which supports an optical recording medium in such a manner that the optical pickup apparatus is able to read/write information signals from/to the optical recording medium,
   wherein the optical pickup apparatus includes a light source, an objective lens which condenses a light beam emitted from the light source on the optical recording medium, and an expander lens unit which includes an adjustable first lens group and an adjustable second lens group, which is disposed on the optical axis between the objective lens and the light source, and in which the distance between the adjustable first and second lens groups is changed so as to correct a spherical aberration which occurs on the optical recording medium, and
   wherein the expander lens unit is disposed such that a focal position of the adjustable second lens group, which is closer to the objective lens than the adjustable first lens group, at the side closer to the objective lens is on an aperture diaphragm of the objective lens.

9. The read/write apparatus according to claim 8, wherein at least one of the adjustable first and second lens groups includes a plurality of lenses.

10. The adjustable read/write apparatus according to claim 8, wherein, when the distance between the adjustable first and the adjustable second lens groups of the expander lens unit is changed, the distance between the second lens group and the aperture diaphragm of the objective lens is maintained constant and the first lens group is moved.

11. The read/write apparatus according claim 10, wherein at least one of the adjustable first and second lens groups includes a plurality of lenses.

12. A read/write apparatus comprising:
   an optical pickup apparatus; and
   optical recording medium supporting means which supports an optical recording medium in such a manner that the optical pickup apparatus is able to read/write information signals from/to the optical recording medium, wherein the optical pickup apparatus includes a light source, an objective lens which condenses a light beam emitted from the light source on the optical recording medium, and a collimator lens unit which is disposed on the optical axis between the objective lens and the light source, wherein the collimator lens unit is disposed such that a focal position at the side closer to the objective lens is on an aperture diaphragm of the objective lens, and wherein the collimator lens unit includes at least two lenses that are moved together as a single unit alone the optical axis to correct a spherical aberration that occurs on the optical recording medium.

13. The read/write apparatus according to claim 12, wherein the collimator lens unit includes two or more lens groups.

14. The read/write apparatus of claim 12, wherein when the light source is moved along the optical axis, the quantity of light incident to the objective lens remains constant.

15. A method for communicating information signals with optical recording media, the method comprising:

emitting a light beam from a light source;

collimating the light beam into a plane wave;

condensing the plane wave onto the optical recording media;

positioning an aperture diaphragm at a focal position of the plane wave;

moving the light source along the optical axis in a direction towards or away from the optical recording media, wherein the collimator lens unit includes at least two lenses that are moved together as a single unit along the optical axis to correct a spherical aberration that occurs on the optical recording medium.

16. The method of claim 15, wherein when the light source is moved the diameter of the plane wave remains constant at the aperture diaphragm.

* * * * *